Figure 1:
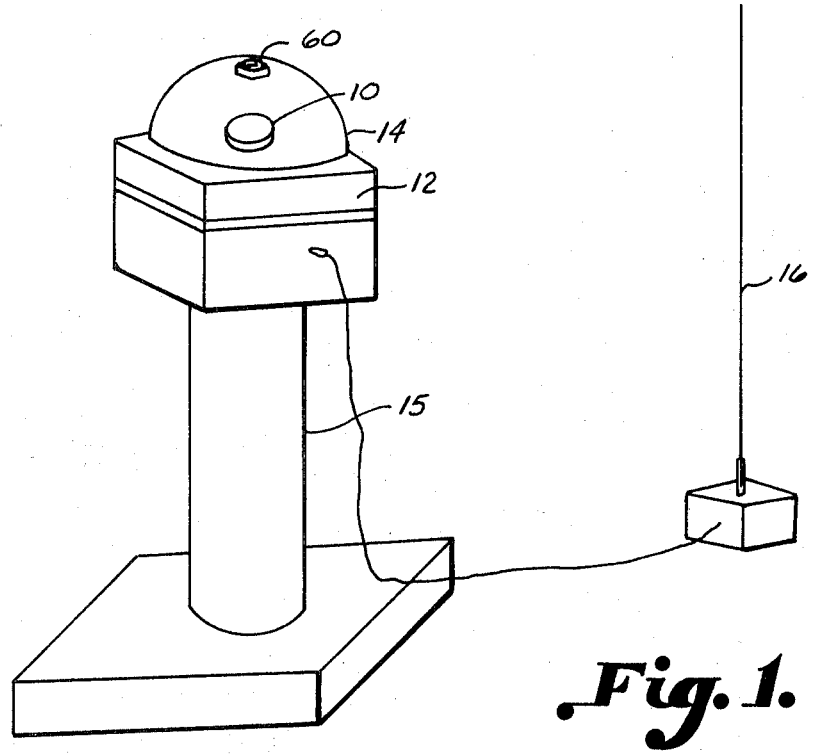

United States Patent [19]
Fletcher et al.

[11] 3,759,152
[45] Sept. 18, 1973

[54] AUTOMATIC LIGHTNING DETECTION AND PHOTOGRAPHIC SYSTEM

[76] Inventors: James C. Fletcher, Administrator of the National Aeronautics & Space Administration with respect to an invention of; Ronald J. Wojtasinski, Cocoa Beach; Larry D. Holley, Merritt Island; Jimmie L. Gray; Robert B. Hoover, both of Titusville, all of Fla.

[22] Filed: Sept. 27, 1972

[21] Appl. No.: 292,682

[52] U.S. Cl. .................................. 95/11, 95/11.5
[51] Int. Cl. ................................... G03b 17/38
[58] Field of Search .......................... 95/11, 11.5

[56] References Cited
UNITED STATES PATENTS
2,419,978   5/1947   Wildman .................... 95/11.5 A Primary Examiner—John M. Horan
Attorney—James O. Harrell et al.

[57] ABSTRACT

A system for monitoring and recording lightning strokes within a predetermined area with a camera having an electrically operated shutter with means for advancing the film in the camera after activating the shutter. The system includes an antenna for sensing lightning strikes which, in turn, generates a signal, that is fed to an electronic circuit which generates signals for operating the shutter of the camera. Circuitry is provided for preventing activation of the shutter as the film in the camera is being advanced.

4 Claims, 3 Drawing Figures

PATENTED SEP 18 1973 3,759,152

SHEET 1 OF 2

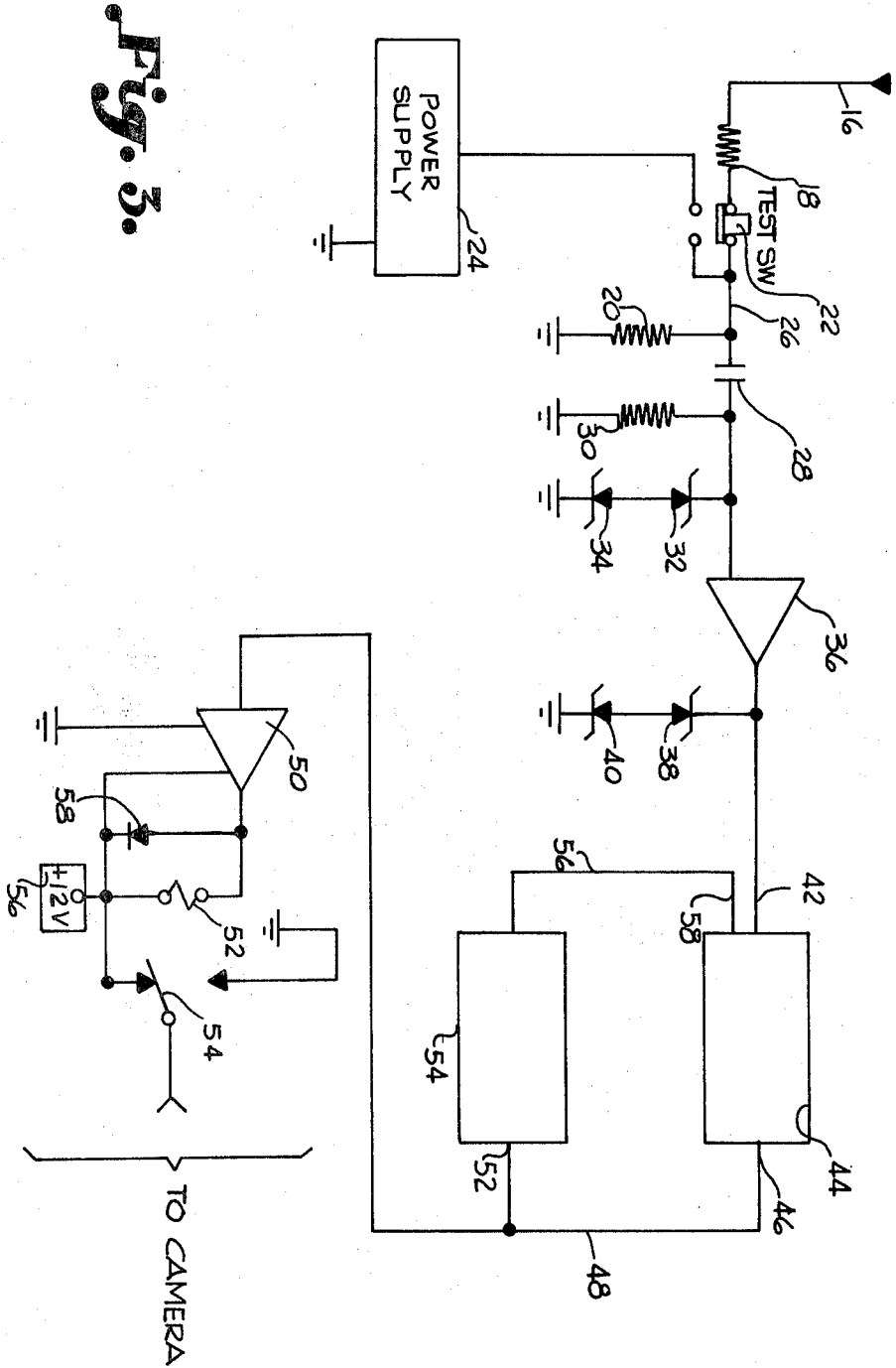

AUTOMATIC LIGHTNING DETECTION AND PHOTOGRAPHIC SYSTEM

This invention described herein was made in performance of work under a NASA Contract and is subject to the provisions of Sections 305 of the National Aeronautics and Space Act of 1968, Public Law 85-568 (72 Stat. 435, 402 U.S.C.P. 2457).

This invention relates to a lightning monitoring system, and more particularly to an apparatus for photographic and recording the location of lightning strikes.

In recent years the space industry has become particularly concerned with the activity of lightning within certain areas, and in particular, around sites from which space vehicles are launched. While many devices have been constructed for locating strikes of lightning, additional information, such as photographs have been desired in order to study and analyze various lightning storms.

The system constructed in accordance with the present invention receives and detects the sferics signal eminated from lightning and photographs the lightning and the time of occurrence. The photograph shows the azimuth of the lightning from the camera system location. Cameras at two locations can provide photographs from which the location of the lightning strike can be triangulated. Land features and target objects provide azimuth references. The photograph time indicated by a clock correlates the time of occurrence of the lightning strike.

A system constructed in accordance with the present invention is provided for photographing and locating lightning strikes and includes the following basic parts: (1) A camera having an electrically operable shutter with means for advancing the film in the camera after activating the shutter, (2) an antenna for generating a signal responsive to the lightning strike, (3) a first electronic means coupled to the antenna for generating a shutter activating signal, (4) means for coupling the camera to the first electronic means for receiving the shutter activating signal to activate said shutter in order to take the picture of the lightning strike, and (5) a second electronic means coupled to the first electronic means for generating a disabling signal responsive to receiving the shutter activating signal for disabling said first electronic means for a predetermined period of time after the first electronic means generates the shutter activating signal. Thus, the camera has sufficient time between activation of the shutter for advancing the film.

Accordingly, it is an important object of the present invention to provide a system for photographing and locating lightning strikes.

Another important object of the present invention is to provide a system which photographs and records lightning strikes that is not activated by D.C. signals caused by corona current and slowly varying static fields within the area.

Another important object of the present invention is to provide a system for operating a camera for recording a lightning strike that is designed to allow predetermined delays between activation of the shutter so as to permit sufficient time for the advancement of the film therein.

Figure 2:
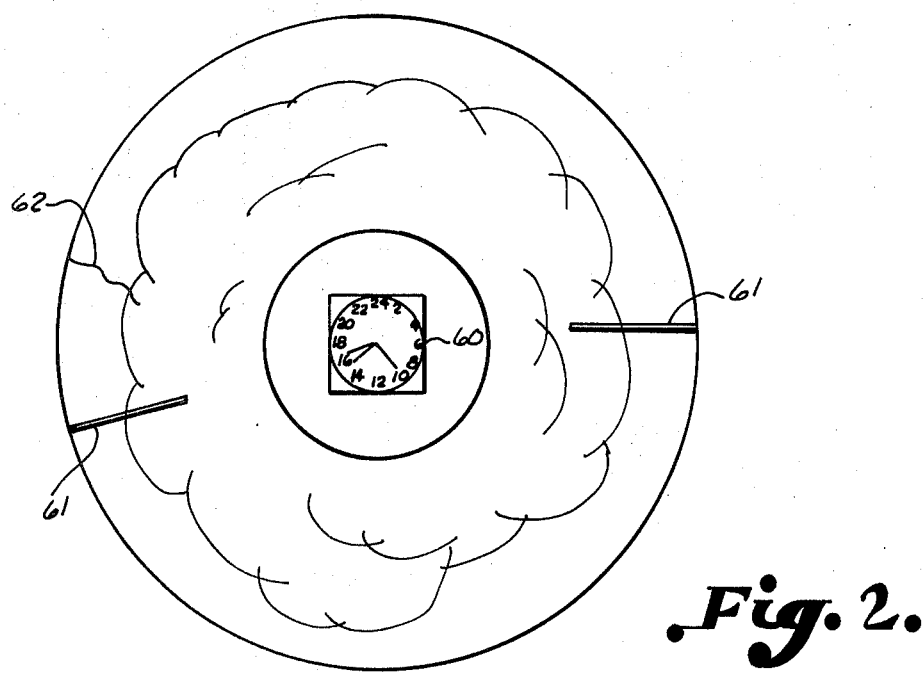

Other objects and advantages of this invention will become more apparent from a reading of the following detailed description and appended claims, taken in conjunction with the accompanying drawings wherein:

FIG. 1 is a perspective view illustrating the camera mounted within a housing for photographing the lightning strikes, FIG. 2 is a simulated photograph of a lightning strike, FIG. 3 is a schematic diagram illustrating the electronic circuit for sensing the lightning strike and operating the camera.

Referring in more detail to the drawings, there is illustrated in FIG. 1 the lens 10 of a camera which is carried within a Fiberglas housing 12 that has a clear plastic dome 14 positioned on the top thereof. The camera is positioned within the housing 12 so that the lens is facing directly upwards. The lens is a conventional lens frequently referred to as a fish-eye lens that when positioned in the vertical direction takes a 360° photograph such as simulated in FIG. 2. The camera is a conventional motorized camera that has a magazine which contains a 250 frame roll of 35mm film. Each time the shutter on the camera operates the film advances one frame. The shutter is capable of being operated by an electrical signal. The housing 12 is mounted on a vertical pedestal 15 located within the area where the lightning is to be monitored. A whip antenna 16 is positioned closely thereby so as to sense the electrical charge generated by the lightning strike and feed a signal to the electrical system enclosed within the housing 12.

The signal generated by the antenna 16 is fed through a voltage divider consisting of resistors 18 and 20 which regulates the voltage to a particular value which can be handled by the subsequent circuit. A test switch 22 is provided in the circuit between the resistors 18 and 20 so as to selectively connect a power supply 24 to lead 26 when it is desired to test the operability of the circuit. The output of the voltage divider network is connected to a differentiator consisting of capacitor 28 and resistor 30. The differentiator operates as a high-pass filter and the capacitor 28 in one particular embodiment, is a one micro farads capacitor which rejects D.C. signals caused by corona current and slowly varying static fields. Coupled to lead 26 following the differentiator is a Zener diode over voltage protection circuit consisting of back to back Zener diodes 32 and 34. Such prevents excessive voltage in the circuit. The signal is then fed to the input of a low gain amplifier 36 which, in turn, has its output connected to another over voltage protecting circuit consisting of back-to-back Zener diodes 38 and 40. The amplifier signal from the low gain amplifier 36 is then fed into one input 42 of a monostable multivibrator 44. The output 46 of the monostable multivibrator, in turn, is fed through lead 48 to the input of an amplifier 50 and also to the input 52 of a second monostable multivibrator 54. The trailing edge of the output pulse from the monostable multivibrator 44 triggers multivibrator 54 which produces a pulse which is fed through lead 56 to inhibit input terminal 58 of monostable multivibrator 44 to inhibit an output from monostable multivibrator 44 for a predetermined period of time. This period of time is governed by the time necessary to advance the film within the camera after the shutter has been activated.

The output of amplifier 50 is fed to a relay coil 52 which when energized closes relay contact 54 to connect a power supply 56 in the form of a 12 volt D.C. signal through relay contact 54 to the shutter mechanism of the camera for activating the shutter. When the shutter is activated such takes a picture of the lightning which generated the signal. Positioned in shunt with the relay coil 52 is a diode 58 which suppresses any noise that may be generated in the relay coil or by the camera.

A 24 hour clock 60 is positioned directly over the lens 10 of the camera in the dome 14 so that when the shutter is activated the exact time when such takes place in recorded on the film. Reference lines 61 may also be placed on the dome for providing a reference point so as to locate the exact position of the lightning.

As can be seen in FIG. 2, the lightning strike 62 is extending downwardly from the cloud formation to the horizon. The time on the clock 60 indicates the exact time that the exposure took place. The lines 61 are reference points. If two cameras are utilized and positioned at different monitoring stations, then the exact distance, as well as location of the lightning strike, may be calculated.

While a preferred embodiment of the invention has been described using specific terms, such description is for illustrative purposes only, and it is to be understood that changes and variations may be made without departing from the spirit or scope of the following claims.

I claim:

1. A system for monitoring and recording lightning strikes within a predetermined area with a camera having an electrically operable shutter with means for advancing the film in the camera after activating said shutter comprising:
   A. an antenna for generating a signal responsive to a lightning strike;
   B. a first electronic means coupled to said antenna for generating a shutter activating signal;
   C. means for coupling said camera to said first electronic means for receiving said shutter activating signal to activate said shutter for taking a picture of said lightning strike; and
   D. a second electronic means coupled to said first electronic means for generating a disenabling signal responsive to receiving said shutter activating signal for disenabling said first electronic means for a predetermined period of time after said first electronic means generates said shutter activating signal;
   whereby said camera has sufficient time between activation of said shutter for advancing the film therein.

2. The system as set forth in claim 1 further comprising:
   A. an differentiating circuit interposed between said first electronic means and said antenna for passing signals generated by a lightning strike while preventing the passage of spurious signals.

3. The system as set forth in claim 1, wherein said first and second electronic means are monostable multivibrators.

4. A system for monitoring and recording lightning strikes within a predetermined area with a camera having a lens facing skyward, an electrically operable shutter, and means for automatically advancing film carried in said camera after activating said shutter the system comprising:
   A. an antenna for generating an electrical signal responsive to a lightning strike;
   B. an amplifier means coupled to said antenna for amplifying said electrical signal;
   C. a source of electrical power;
   D. relay means coupled between said source of electrical power and said electrically operable shutter for supplying power to said shutter responsive to being energized;
   E. a first monostable multivibrator coupled between said amplifier means and said relay means for producing a pulse for energizing said relay means responsive to receiving said amplified electrical signal; and
   F. a second monostable multivibrator coupled to said first monostable multivibrator for generating a disenabling pulse responsive to receiving said pulse from said first monostable multivibrator for disenabling said first monostable multivibrator for a predetermined period of time after said shutter has been activated;
   whereby said camera has sufficient time between motivation of said shutter for advancing the film therein.

* * * * *